United States Patent [19]
Lau

[11] Patent Number: 5,944,181
[45] Date of Patent: Aug. 31, 1999

[54] DISK PROTECTIVE ENCLOSURE

[75] Inventor: Kwok Din Lau, Chai Wan, The Hong Kong Special Administrative Region of the People's Republic of China

[73] Assignee: Finest Industrial Co., Ltd., Chai Wong, The Hong Kong Special Administrative Region of the People's Republic of China

[21] Appl. No.: 09/150,278

[22] Filed: Sep. 9, 1998

[51] Int. Cl.⁶ .................................................. B65D 85/30
[52] U.S. Cl. ...................... 206/308.1; 206/310; 206/493
[58] Field of Search .............................. 206/308.1, 309, 206/310, 313, 493

[56] References Cited

U.S. PATENT DOCUMENTS

| | | | |
|---|---|---|---|
| 520,384 | 2/1894 | Wu-Chen | 206/308.1 |
| 4,793,479 | 12/1988 | Otsuka et al. . | |
| 4,895,252 | 1/1990 | Nomula et al. . | |
| 5,251,750 | 10/1993 | Gelardi et al. . | |
| 5,494,156 | 2/1996 | Nies | 206/310 |
| 5,515,968 | 5/1996 | Taniyama | 206/310 |
| 5,526,926 | 6/1996 | Deja . | |
| 5,586,651 | 12/1996 | Krummenacher . | |
| 5,660,274 | 8/1997 | Chien | 206/308.1 |
| 5,685,427 | 11/1997 | Kuitems et al. . | |
| 5,769,217 | 6/1998 | Derraugh et al. | 206/308.1 |
| 5,788,068 | 8/1998 | Fraser et al. | 206/310 |

FOREIGN PATENT DOCUMENTS

| | | |
|---|---|---|
| 5051082 | 3/1993 | Japan . |
| 2291640 | 1/1996 | United Kingdom . |
| 974156 | 11/1997 | WIPO . |

*Primary Examiner*—Paul T. Sewell
*Assistant Examiner*—Nhan T. Lam
*Attorney, Agent, or Firm*—Sheldon & Mak

[57] ABSTRACT

A holder for a disk having a central opening and front and back surfaces includes a base having a planar panel and formed with a segmented generally conical projection; and a pedestal projecting forwardly from the base on a pedestal axis. The pedestal includes a central button having radially outwardly projecting retainers, and axially extending stems that are integrally formed as button segments with corresponding ones of the retainers. A laterally spaced pair the arms connected to each of the stems support the button portion in cantilevered relation to the base, the arms sloping radially inwardly and axially forwardly from the panel of the base, the arms collectively having an extended position for retaining the disk by engagement of the front surface by the retainers proximate a central opening. Each pair of arms straddles a respective finger of the pedestal for biasingly contacting the rear face surface of the disk proximate the central opening for displacing the disk axially forwardly relative to the retainers when the arms are in a depressed position, the fingers being deflectable into proximate coplanar relation with the arms, the conical projection of the base extending from the panel toward the button and including main portions of the arms and fingers, the conical projection further including a plurality of skirts extending between adjacent pairs of the arms and being closely spaced therefrom for shielding the arms.

11 Claims, 4 Drawing Sheets

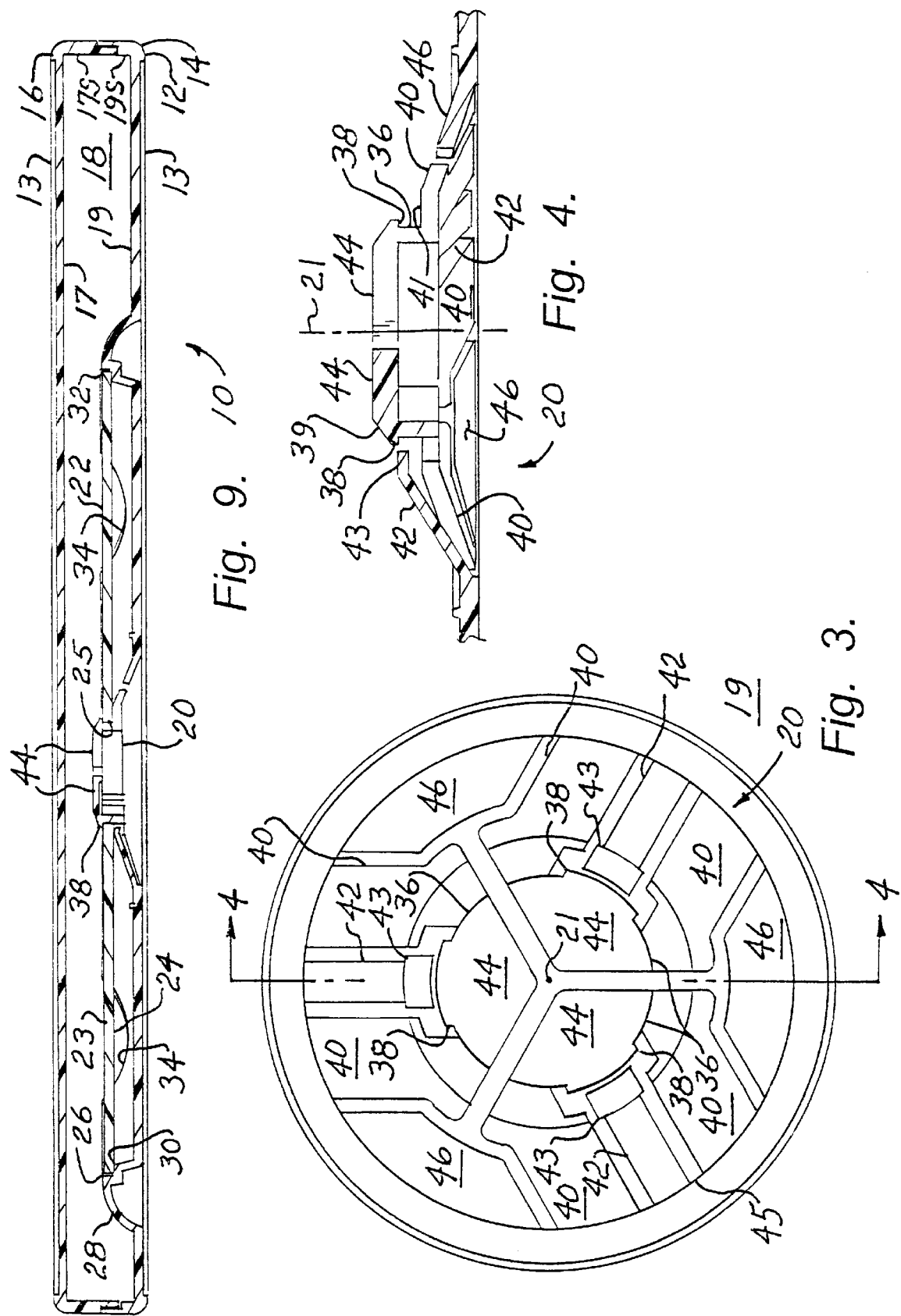

DISK PROTECTIVE ENCLOSURE

BACKGROUND

The present invention relates to optical data disks such as compact disks (CDs) and video disks (DVDs) that have central circular locating openings, and more particularly to devices for protectively enclosing such disks for storage of same.

Data disks such as compact disks and video disks typically have large amounts of digitally stored information that is optically readable through a transparent bottom layer of the disk by a movable head during rotation of the disk. The information is arranged in one or more tracks that are covered by a thin protective top layer of the disk that can have labeling applied thereto such as by silkscreening. Normal handling of the disk can result in scratching of the bottom layer, resulting in loss of data by interference with the optical path such as by loss of focus and/or lateral image displacement. Also, data can be lost by scratching of the protective layer which is typically very thin, on the order of 20 microns, resulting in removal of information from a vapor deposited metal layer that is only about 0.1 micron thick. Protective containers for the disks in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against one or more elements of the pedestal. Removal of the disk is similarly effected by finger pressure against the pedestal and simultaneous lifting at the perimeter portions. U.S. Pat. No. 5,685,427 to Kuitems et al. discloses a compact disk holder having a central post that projects from a shoulder surface, the post having an outwardly facing ridge for gripping the disk opposite the shoulder surface. The post is formed with spiral slots for contraction of segments in response to finger pressure. A disadvantage of the holder of Kuitems is that it is difficult to use in that excessive finger pressure is required for contracting the segments; conversely, if the segments are made sufficiently long and thin for contracting under reasonable finger pressure, they are too weak to be effective in holding the disk.

U.S. Pat. No. 5,526,926 to Deja discloses a disk storage case having a segmented central pin that is formed with an outwardly projecting collar for gripping the central hold of the disk, the pin being connected to an outwardly projecting plurality of lifting fingers that pivot upwardly when the pin is contracted by pressure on a central push-button. A disadvantage of the case of Deja is that the fingers are ineffective in that they must be sufficiently elastic to permit depression of the push-button prior to actual lifting of the disk, and they do not retain sufficient elastic strength for reliably lifting the disk, in that projection portions of the fingers have limited length. UK Patent Application No. 2,291,640 by Fraser et al. discloses a compact disk holder having a bifurcated button holder supported on respective inwardly projecting spring arms, segments of the holder being interconnected by a living hinge. Spaced about the button holder are a plurality of inwardly projecting disk ejection spring arms. The holder of Fraser et al. has a number of disadvantages. For example:

1. The ejection spring arms are ineffective in that they contact the disk at some distance from the central hole, and must overcome flexing of the disk to the extent of any residual resistance by the holder;

2. The disk is subject to damage by the ejection spring arms in regions that are sufficiently distant from the central hole as to compromise the integrity of recorded data; and 3. The ejection spring arms are prone to be damaged by being snagged by objects such as a user's clothing.

Thus there is a need for a protective disk container that overcomes the disadvantages of the prior art.

SUMMARY

The present invention meets this need by providing a molded holder configuration wherein structural components are unlikely to be snagged or damaged during normal use and handling, and that is particularly effective and easy to use. In one aspect of the invention, a holder for a disk having a central opening and front and back face surfaces includes a base having a planar panel portion; a pedestal projecting forwardly from the base on a pedestal axis, the pedestal including a central button portion having a plurality of radially outwardly projecting retainer members and a plurality of axially extending stem members; a plurality of arm members supporting the retainer members and the stem members of the button portion in cantilevered relation to the base, the arm members sloping radially inwardly and axially forwardly from the panel portion of the base, the arm members collectively having an extended position for retaining the disk by engagement of the front face surface by the retainer members proximate the central opening, free end extremities of the arm members being deflectable axially rearwardly from the extended position to a depressed position in response to applied pressure against the button portion for producing sufficient corresponding radially inward and axially rearward movement of the retainer members and the stem members to permit passage of the retainer portions and the stem portions through the central opening of the disk; and a plurality of finger members for biasingly contacting the rear face surface of the disk proximate the central opening for displacing the disk axially forwardly relative to the retainer portions when the arm members are in the depressed position, the finger members being deflectable into proximate coplanar relation with the arm members.

Preferably free end extremities of the finger members have laterally and radially extending enlargement surfaces formed thereon for distributing contact forces against the lower disk surface.

The stem portions can be integrally formed as button segments with corresponding ones of the retainer members. Preferably the holder includes a laterally spaced pair of the arm members connected to each of the stem portions, the arm members of each pair straddling a respective one of the finger members, thereby protecting the finger members from being snagged or otherwise damaged by contact with external objects. Preferably forwardly facing surfaces of the button surfaces slope forwardly and inwardly from outer extremities of the retainer members to respective forward extremities of the button segments, the forward extremities being sufficiently confined for ramped engagement with the central opening in the extended position of the arm members.

Preferably the base portion is formed with a segmented generally conical projection extending concentrically with the pedestal axis from the panel portion toward the button portion, the conical projection including main portions of the arm members and the finger members for providing a generally smooth front profile of the pedestal. Preferably the conical projection further includes a plurality of skirt members extending between adjacent pairs of the arm members and being closely spaced therefrom for shielding the arm members.

The base portion can further include an edge support member projecting forwardly from the panel portion and having a shoulder surface for contacting the rear surface of the disk proximate a perimeter extremity thereof and a cylindrical locating surface extending forwardly of the shoulder surface in concentric relation to the pedestal axis for augmenting lateral support of the disk, a pair of finger depressions formed in the edge support member on opposite sides of the pedestal axis, each finger depression interrupting the locating surface for permitting the disk to be gripped by a user's fingers when the disk extends within the locating surface. The shoulder surface can be interrupted by the finger depressions. Preferably the shoulder surface is spaced from the disk in the engaged position of the arm members for limiting deflection of the disk when the arm members are being moved to the depressed position.

DRAWINGS

These and other features, aspects, and advantages of the present invention will become better understood with reference to the following description, appended claims, and accompanying drawings, where:

FIG. 3 is a plan view of the pedestal portion of FIG. 2;

FIG. 4 is a sectional elevational view on line 4—4 of FIG. 3;

FIG. 9 is a sectional elevational view of the container of FIG. 1 in a closed condition with the pedestal supporting the disk as in FIG. 6.

DESCRIPTION

Figure 1:
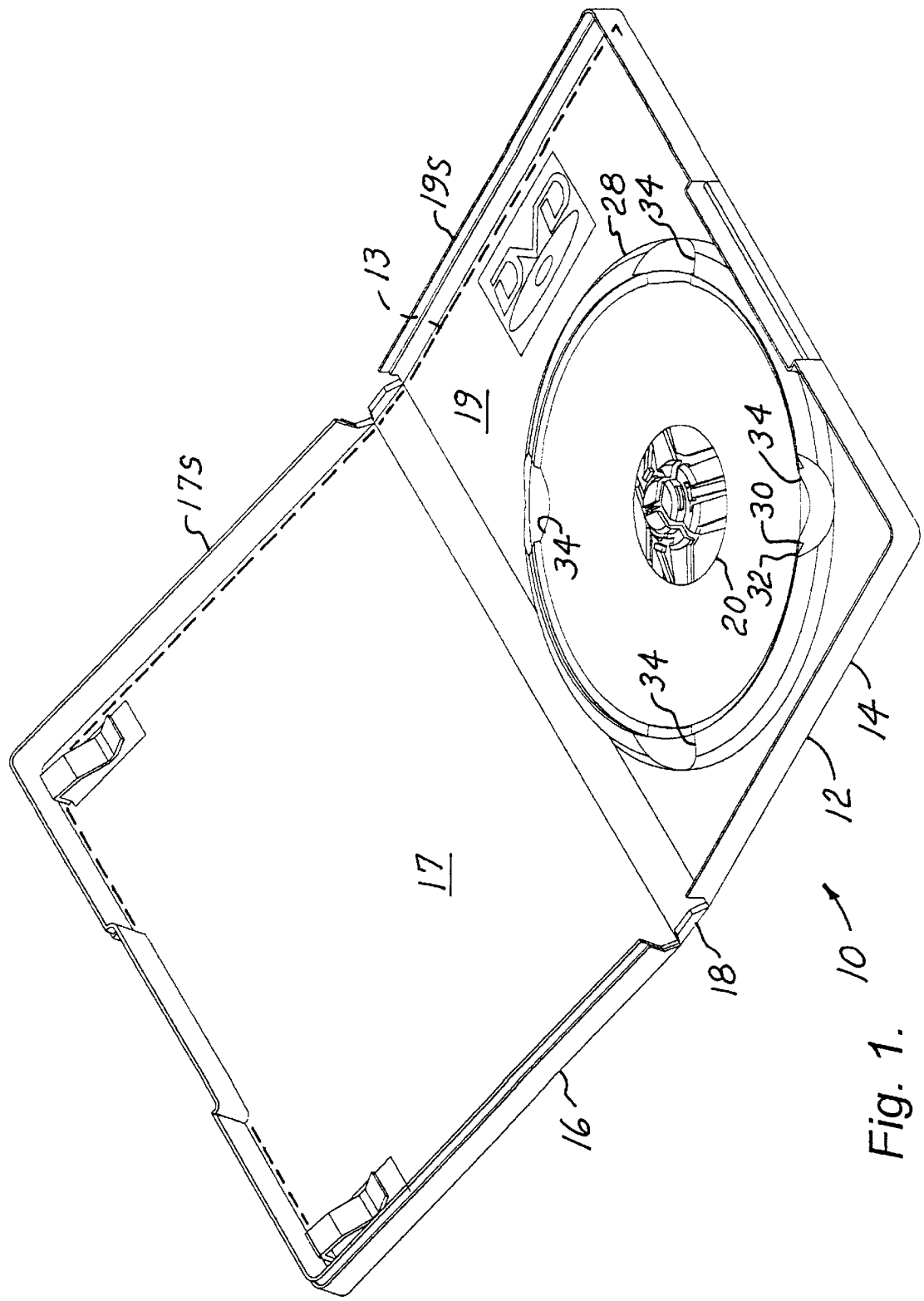
FIG. 1 is a perspective view of a protective disk container according to the present invention, the container being in an open condition.

The present invention is directed to a disk container that is particularly effective for protectively storing disks such as CDs and DVDs. With reference to FIGS. 1–9 of the drawings, a DVD box 10 includes a case 12 having a transparent jacket 13 bonded thereto for displaying printed material (not shown), the case having a base portion 14 a lid portion 16, and a hinge portion 18 that movably connects the base and hinge portions. In an exemplary configuration, the case 12 is an integrally formed molded member, so-called "living hinges" being formed along opposite edges of the hinge portion 18. The base and lid portions 14 and 16 include respective panel portions 17 and 19, and respective perimeter side portions 17S and 19S that conventionally snap together in edgewise adjacency in a closed condition of the box 10, the hinge portion 18 and the side portions 17S and 18S together forming four side walls of the case 12, the lid panel portion 17 forming a front wall, the base panel portion 19 forming a rear wall. The jacket 13 is bonded to the panel portions 17 and 19 along respective perimeter edge portions thereof opposite the hinge portion, being open otherwise for facilitating insertion of the printed material being configured for covering substantially all of the outer surface of the panel portions 17 and 19 and the hinge portion 18. In further description of the case 12, the terms "front" and "forward" with respect to the base refer to a direction toward the lid portion 16 in the closed condition of the box 10; conversely, "rear", "rearward", and "back" refer to a direction away from the lid portion.

A pedestal 20 of the case projects forwardly from the panel portion 19 of the base 14 on a pedestal axis 21 for supportively engaging a digital video disk 22 having front and rear face surfaces 23 and 24, a circular central opening 25, and a periphery 26. An edge-support portion 28 of case 12 also projects forwardly on the panel portion 19 in concentric relation to the pedestal axis 21 for contacting the disk 22 at the periphery 26. The edge-support portion 28 is formed with an edge shoulder 30 for stabilizing the disk 22 against tipping, and a cylindrical locating surface 32 for augmenting lateral support of the disk 22 while the disk is engaged with the pedestal 20. The edge-support portion is also formed with at least one pair of finger depressions 34 for permitting opposite perimeter portions of the disk 22 to be grasped by a user of the container 10, the edge shoulder 30 and the cylindrical locating surface 32 being interrupted by the finger depressions 34.

Figure 8:
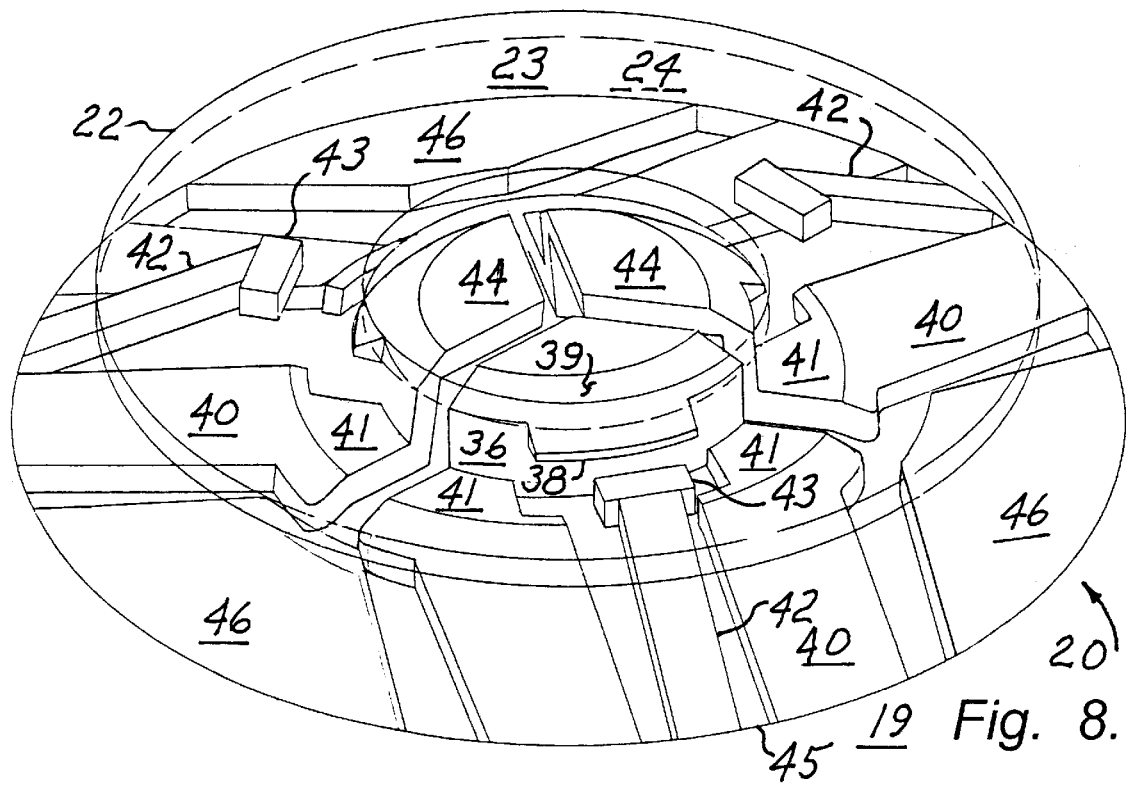
FIG. 8 is a perspective view as in FIG. 2, showing the pedestal portion and disk (pictured reduced in outside diameter) in the relationship of FIG. 7.
Figure 6:
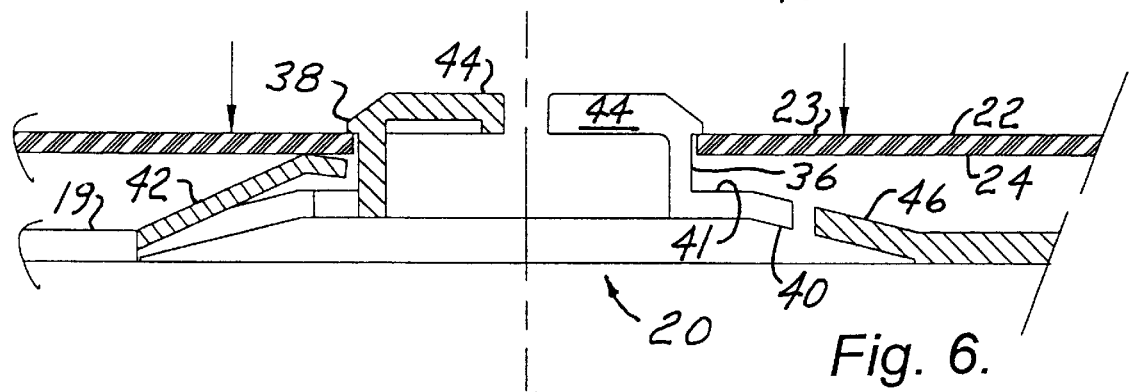
FIG. 6 is a detail view as in FIG. 5, showing the disk pressed into engagement with the pedestal.
Figure 7:
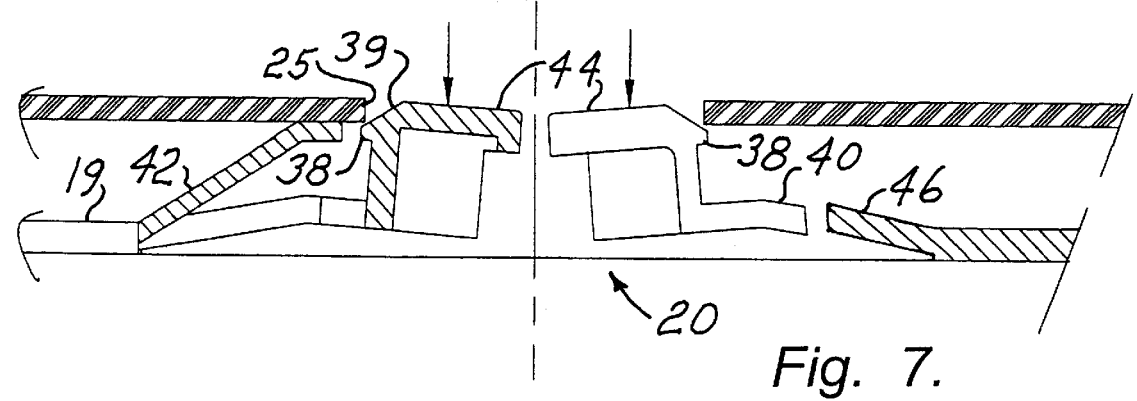
FIG. 7 is a detail view as in FIG. 5, showing the pedestal portion deformed to a contracted condition, the disk being released therefrom.

According to the present invention, the pedestal 20 is formed with a plurality of stem portions 36, and retainer portions 38 being angularly spaced about the pedestal axis 21 and supported at free ends of angularly spaced arm members 40, the arm members being cantilevered and sloping radially inwardly and axially forwardly from the base 14 and being sufficiently flexible for movement between an extended position wherein the retainer portions 38 contact the front surface 23 of the disk 22 with the stem portions 36 projecting into the central opening 25 as shown in FIGS. 6 and 9, and a depressed position wherein the retainer portions 28 and the stem portions 36 are displaced axially rearwardly and radially inwardly for clearing the central opening 25 as shown in FIGS. 7 and 8. Inner extremities of the arm members 40 are formed with respective contact portions 41 that extend generally in coplanar relation parallel to the base panel portion 19. The pedestal 20 also includes a plurality of finger members 42 having respective contact portions 43 for urging the disk 22 axially forwardly relative to the retainer portions 38, thereby to facilitate disengagement of the retainer portions 38 from the upper disk surface 23 and passage of the retainer portions into the central opening 25. The contact portions 43 of the finger members are enlarged laterally as best shown in FIG. 3 for limiting concentrations of the biasing forces against the rear surface 24 of the disk 22. The finger members 42 are protected from damage by being located in close proximity with the arm members and being oriented approximately parallel therewith as further described below.

Figure 2:
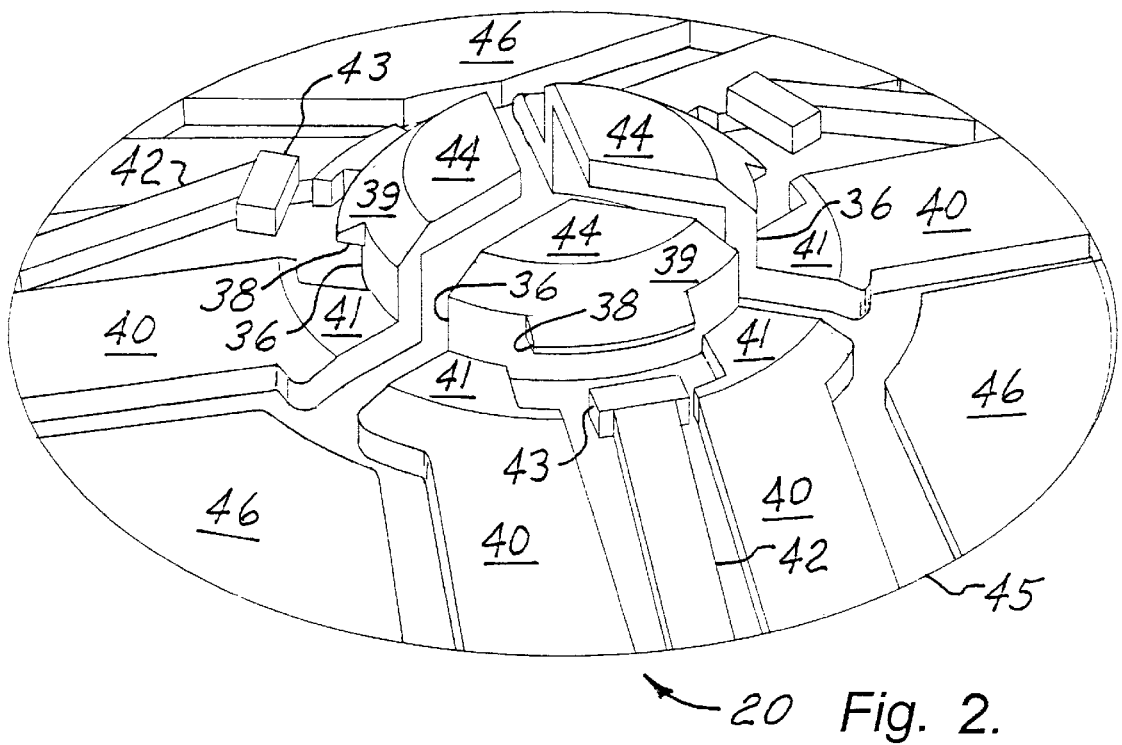
FIG. 2 is a perspective view detailing a central pedestal portion of the container of FIG. 1, the pedestal portion being in a relaxed condition.
Figure 5:
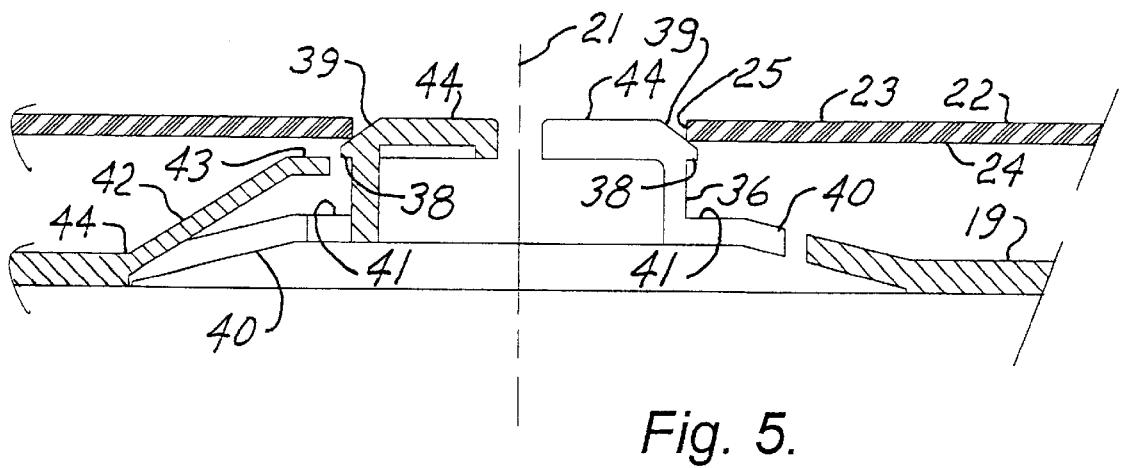
FIG. 5 is a fragmentary sectional elevational view, showing a disk positioned preparatory to engagement with the pedestal portion of FIG. 2.

In the exemplary and preferred configuration of the pedestal 20 as shown and described herein, respective ones of the stem portions 36 and retainer portions 38 are integrally formed as corresponding button segments 44, each button segment 44 having a conical chamfer surface 39 that extends to outer extremities of the stem and retainer portions 36 and 38. Each of the button segments 44 is supported by a generally parallel-spaced pair of the arm members 40, and each of the finger members 42 extends between a corresponding pair of the arm members 40 in generally parallel spaced relation thereto. In a relaxed condition of the pedestal 20 as best shown in FIG. 2, the finger members 42 extend slightly forwardly of the arm members 40, outer extremities of the arm members 40 and the finger members 42 extending to the base panel portion 19 and being joined thereto along a circular outer perimeter 45 of the pedestal 20, the perimeter 45 being coplanar with a front surface of the panel portion 19. Thus the finger members 42 are protected from breakage by being located in generally co-conical relation with the arm members 40. When the disk 22 is latched onto the pedestal 20 with the retainer portions 38 contacting the front disk surface 23, the back disk surface 24 rests on or proximate the contact portions 41 of the arm members 40, the contact portions 41 being thus approximately coplanar with the contact portions 43 of the finger members 42. In this condition of the pedestal 20, further downward deflection of the finger members 42 relative to the arm members 40 is prevented by the disk 22 contacting the arm member contact portions 43. Further, the combination of the arm members 40 and the finger members 42 advantageously provides a greatly increased resistance to further downward movement of the disk proximate the central opening 25 thereof.

The arm members 40 are also protected from breakage or permanent deformation by the pedestal 20 further including a plurality of skirt members 46 that extend inwardly and forwardly from the outer perimeter 44 in approximately co-conical relation to the arm members 44, each of the skirt members 46 being closely spaced edgewise from a divergent pair of the arm members 40. In the relaxed condition of the pedestal 20, the arm members 40 in combination with the skirt members 46 form an advantageously smooth frusto-conical front face of the pedestal 20 that extends from the base panel 19 at the outer perimeter 44 inwardly and forwardly to the contact portions 41 of the arm members 40. Thus the arm members 40 as well as the button portions 41 are protected from being caught and possibly being damaged by contact with objects such as clothing of a user of the container 10. The finger members 42, in addition to the protections described above, extend inwardly to proximate the retainer portions 38 in the relaxed condition of the pedestal 20. This further protects the finger members, the retainer portions 38 serving to shield the ends 43 of the finger members from being bumped or snagged by extraneous objects during normal handling of the container 10 when the disk 22 is removed and the lid portion 16 is open.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A holder for a disk having a central opening and front and back face surfaces, the holder comprising:
   (a) a base having a planar panel portion;
   (b) a pedestal projecting forwardly from the base on a pedestal axis, the pedestal including:
      (i) a central button portion having a plurality of radially outwardly projecting retainer members and a plurality of axially extending stem members;
      (ii) a plurality of arm members supporting the retainer members and the stem members of the button portion in cantilevered relation to the base, the arm members sloping radially inwardly and axially forwardly from the panel portion of the base, the arm members collectively having an extended position for retaining the disk by engagement of the front face surface by the retainer members proximate the central opening, free end extremities of the arm members being deflectable axially rearwardly from the extended position to a depressed position in response to applied pressure against the button portion for producing sufficient corresponding radially inward and axially rearward movement of the retainer members and the stem members to permit passage of the retainer portions and the stem portions through the central opening of the disk; and
      (iii) a plurality of finger members for biasingly contacting the rear face surface of the disk proximate the central opening for displacing the disk axially forwardly relative to the retainer portions when the arm members are in the depressed position, the finger members being deflectable into proximate coplanar relation with the arm members.

2. The holder of claim 1, wherein free end extremities of the finger members have laterally and radially extending enlargement surfaces formed thereon for distributing contact forces against the lower disk surface.

3. The holder of claim 1, wherein the stem portions are integrally formed as button segments with corresponding ones of the retainer members.

4. The holder of claim 3, comprising a laterally spaced pair of the arm members connected to each of the stem portions, the arm members of each pair straddling a respective one of the finger members.

5. The holder of claim 3, wherein forwardly facing surfaces of the button surfaces slope forwardly and inwardly from outer extremities of the retainer members to respective forward extremities of the button segments, the forward extremities being sufficiently confined for ramped engagement with the central opening in the extended position of the arm members.

6. The holder of claim 1, wherein the base portion is formed with a segmented generally conical projection extending concentrically with the pedestal axis from the panel portion toward the button portion, the conical projection including main portions of the arm members and the finger members.

7. The holder of claim 6, wherein the conical projection further includes a plurality of skirt members extending between adjacent pairs of the arm members and being closely spaced therefrom for shielding the arm members.

8. The holder of claim 1, wherein the base portion further comprises an edge support member projecting forwardly from the panel portion, the edge support member having a shoulder surface for contacting the rear surface of the disk proximate a perimeter extremity thereof and a cylindrical locating surface extending forwardly of the shoulder surface in concentric relation to the pedestal axis for augmenting lateral support of the disk, the edge support member having a pair of finger depressions formed therein on opposite sides of the pedestal axis, each finger depression interrupting the locating surface for permitting the disk to be gripped by a user's fingers when the disk extends within the locating surface.

9. The holder of claim 8, wherein the shoulder surface is interrupted by the finger depressions.

10. The holder of claim 8, wherein the shoulder surface is spaced from the disk in the engaged position of the arm members for limiting deflection of the disk when the arm members are being moved to the depressed position.

11. A holder for a disk having a central opening and front and back face surfaces, the holder comprising:
 (a) a base having a planar panel portion, the base portion being formed with a segmented generally conical projection;
 (b) a pedestal projecting forwardly from the base on a pedestal axis, the pedestal including:
  (i) a central button portion having a plurality of radially outwardly projecting retainer members and a plurality of axially extending stem members, the stem members being integrally formed as button segments with corresponding ones of the retainer members;
  (ii) a laterally spaced pair the arm members connected to each of the stem portions for supporting the button portion in cantilevered relation to the base, the arm members sloping radially inwardly and axially forwardly from the panel portion of the base, the arm members collectively having an extended position for retaining the disk by engagement of the front face surface by the retainer members proximate the central opening, free end extremities of the arm members being deflectable axially rearwardly from the extended position to a depressed position in response to applied pressure against the button portion for producing sufficient corresponding radially inward and axially rearward movement of the retainer members and the stem members to permit passage of the retainer portions and the stem portions through the central opening of the disk, forwardly facing surfaces of the button segments sloping forwardly and inwardly from outer extremities of the retainer members to respective forward extremities of the button segments, the forward extremities being sufficiently confined for ramped engagement with the central opening in the extended position of the arm members; and
  (iii) a plurality of finger members, each pair of arm members straddling a respective one of the finger members, for biasingly contacting the rear face surface of the disk proximate the central opening for displacing the disk axially forwardly relative to the retainer portions when the arm members are in the depressed position, the finger members being deflectable into proximate coplanar relation with the arm members, the conical projection of the base member extending concentrically with the pedestal axis from the panel portion toward the button portion, the conical projection including main portions of the arm members and the finger members, the conical projection further including a plurality of skirt members extending between adjacent pairs of the arm members and being closely spaced therefrom for shielding the arm members.

* * * * *